United States Patent [19]
Nilssen

[11] Patent Number: 4,887,201
[45] Date of Patent: Dec. 12, 1989

[54] SELF-OSCILLATING INVERTER WITH ADJUSTABLE FREQUENCY

[76] Inventor: Ole K. Nilssen, Caesar Dr., Barrington, Ill. 60010

[21] Appl. No.: 256,202

[22] Filed: Oct. 11, 1988

Related U.S. Application Data

[63] Continuation of Ser. No. 853,850, Apr. 21, 1986, abandoned.

[51] Int. Cl.⁴ .......................................... H02M 7/5387
[52] U.S. Cl. ....................................... 363/132; 363/100; 363/133
[58] Field of Search ............... 323/249, 250, 329, 330; 331/113 A; 336/110; 363/17, 22, 100, 132, 133

[56] References Cited

U.S. PATENT DOCUMENTS

| Re. 31,758 | 12/1984 | Nilssen | 363/133 |
|---|---|---|---|
| 2,674,705 | 4/1954 | Schwieg | 323/330 |
| 2,907,991 | 10/1959 | Van Allen | 331/113 A |
| 2,959,744 | 11/1960 | Wengryn | 331/113 A |
| 2,964,716 | 12/1960 | Berman | 331/113 A |
| 2,991,414 | 7/1961 | Tillman | 331/113 A |
| 3,133,256 | 5/1964 | Denelsbeck et al. | 331/113 A |
| 3,648,117 | 3/1972 | Yamamoto et al. | 336/110 |
| 3,803,475 | 4/1974 | Anichini | 331/181 |
| 3,860,883 | 1/1975 | Bernin | 336/110 |
| 4,513,364 | 4/1985 | Nilssen | 331/113 A |
| 4,644,459 | 2/1987 | Nilssen | 363/133 |
| 4,692,681 | 9/1987 | Nilssen | 323/347 |

FOREIGN PATENT DOCUMENTS 675142 12/1963 Canada.

Primary Examiner—Patrick R. Salce
Assistant Examiner—Jeffrey Sterrett

[57] ABSTRACT

A self-oscillating inverter uses saturable transformer means in its positive feedback circuit. The saturation flux density of the magnetic material used in this saturable transformer means determines the frequency of inverter oscillation. A permanent magnet is rotatably mounted proximate to the saturable transformer means and is used for adjustably affecting the saturation flux density of the magnetic material, thereby correspondingly to adjust the frequency of oscillation: the stronger the magnetic flux provided to the magnetic material from the permanent magnet, the smaller the saturation flux density and the higher the frequency of oscillation.

9 Claims, 1 Drawing Sheet

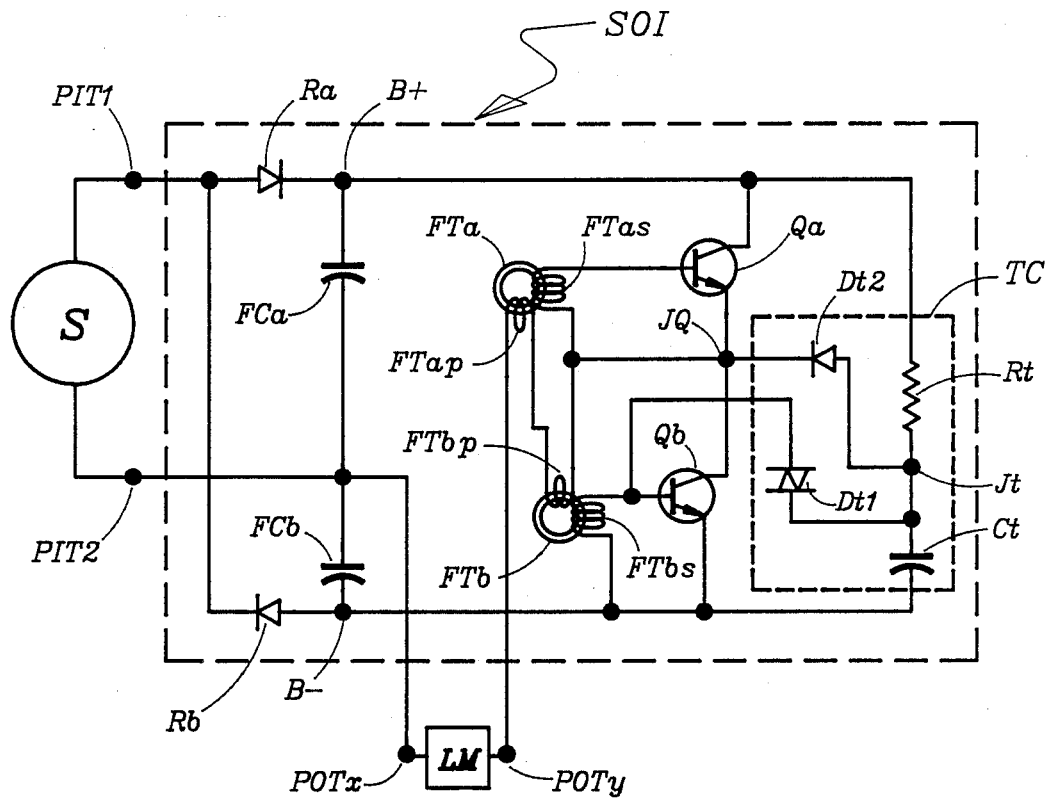
Fig. 1
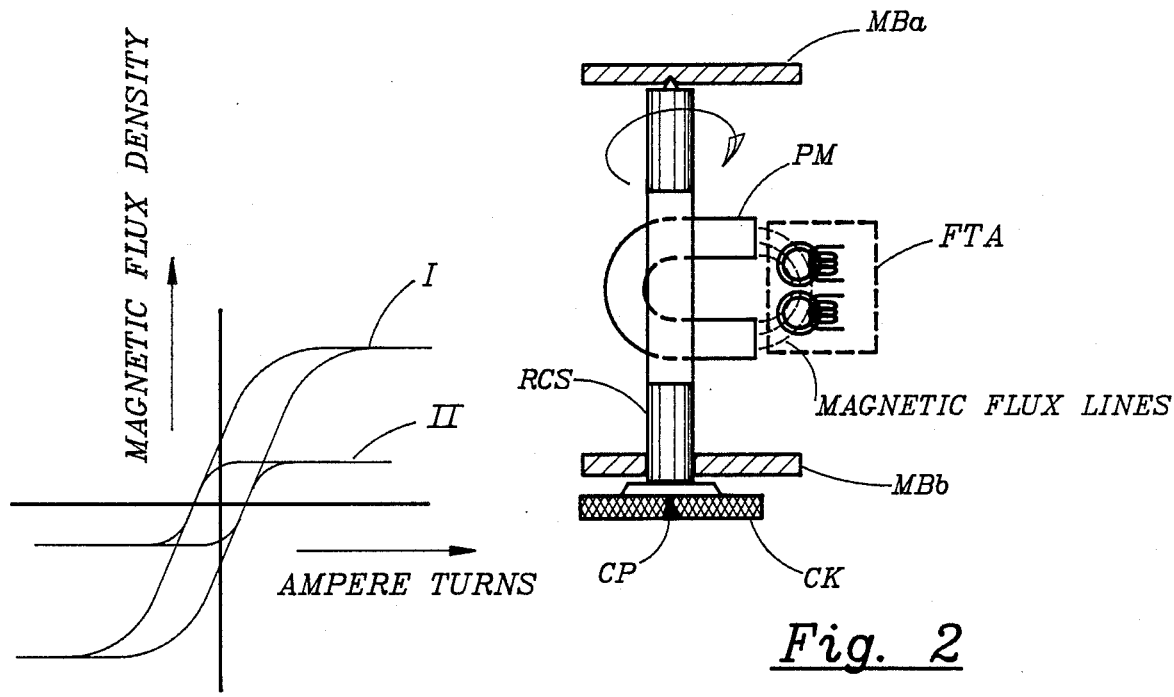
Fig. 2
Fig. 3

SELF-OSCILLATING INVERTER WITH ADJUSTABLE FREQUENCY

RELATED APPLICATION

This application is a continuation of Ser. No. 06/853,850 filed Apr. 21, 1986, now abandoned.

BACKGROUND OF THE INVENTION

Field of Invention

The present invention relates to self-oscillating inverters, particularly of a type having adjustable oscillation frequency.

SUMMARY OF THE INVENTION

Objects of the Invention

An object of the present invention is that of providing a cost-effective means to permit simple manual adjustment of the frequency of a self-oscillating inverter.

This, as well as other objects, features and advantages of the present invention will become aparent from the following description and claims.

Brief Description

In the preferred embodiment of the present invention, regular power line voltage is rectified, filtered and applied to a self-oscillating half-bridge inverter. The two-transistor inverter provides its substantially squarewave output voltage across a pair of output terminals; which, in turn, provides load current to a load means.

The inverter's self-oscillation is accomplished by feeding load current back to drive the base-emitter junctions of the inverter's two transistors. This positive feedback is accomplished by way of two saturable current transformers—one for each transistor. The frequency of oscillation is determined by the magnitude of the magnetic saturation flux of the ferrite cores of the two current transformers: the lower this saturation flux magnitude, the higher the frequency of oscillation.

A permanent magnet is mounted near the ferrite cores of the two saturable current transformers and so arranged that it can be manually adjusted in position relative to these two cores in such manner that the amount of magnetic flux from the permanent magnet that couples to these cores can be adjusted by adjusting the position of the magnet. The arrangement permits the degree of flux-coupling from the permanent magnet to the ferrite cores to be adjusted from an initial point of providing substantially zero cross-magnetizing flux to the ferrite cores to a final point of providing enough cross-magnetizing flux to cause effective cross-magnetic saturation of the two ferrite cores.

Calibration marks are provided by which the frequency of the inverter oscillation can be set in accordance with a predetermined desire.

BRIEF DESCRIPTION OF THE DRAWINGS

FIG. 1 provides a schematic diagram of the electrical circuitry of a self-oscillating inverter having two saturable ferrite core feedback transformers.

FIG. 2 provides an illustration of an arrangement whereby a permanent magnet can be adjustably positioned relative to the two saturable ferrite core feedback transformers.

FIG. 3 shows the saturation flux characteristics of the ferrite cores under a first condition where substantially no cross-magnetic flux is present, as well as under a second condition where a substantial amount of cross-magnetic flux is present.

DESCRIPTION OF THE PREFERRED EMBODIMENT

Details of Construction

FIG. 1 shows a source of voltage S, which represents an ordinary 120 Volt/60 Hz electric utility power line. Connected across the output terminals of S, by way of its power input terminals PIT1 and PIT2, is subject self-oscillating inverter SOI.

Power input terminal PIT1 is connected with the anode of a first rectifier Ra and with the cathode of a second rectifier Rb. The cathode of rectifier Ra is connected with a B+ bus, and the anode of rectifier Rb is connected with a B— bus. A first filter capacitor FCa is connected between the B+ bus and power input terminal PIT2; and a second filter capacitor FCb is connected between power input terminal PIT2 and the B— bus.

A first transistor Qa is connected with its collector to the B+ bus and with its emitter to a junction JQ. A second transistor Qb is connected with its collector to junction JQ and with its emitter to the B— bus.

A first saturable current feedback transformer FTa has a primary winding FTap and a secondary winding FTas, which secondary winding is connected across the base-emitter junction of transistor Qa. A second saturable current feedback transformer FTb has a primary winding FTbp and a secondary winding FTbs, which secondary winding is connected across the base-emitter junction of transistor Qb.

A first inverter power output terminal POTx is connected directly with power input terminal PIT2. A second inverter power output terminal POTy is connected with junction JQ by way of series-connected primary windings FTap and FTbp.

A resistor Rt is connected between the B+ bus and a junction Jt; a capacitor Ct is connected between Jt and the B— bus; a Diac Dt1 is connected between Jt and the base of transistor Qb; and a diode Dt2 is connected with its anode to junction Jt and with its cathode to junction JQ.

The circuit comprising elements Rt, Ct, Dt1 and Dt2 is referred to as trigger circuit TC.

A load means LM is connected across power output terminals POTx and POTy.

FIG. 2 pseudo-schematically shows the mechanical arrangement by which a permanent magnet PM is mounted to a rotatable control shaft RCS; which shaft, in turn, is frictionally supported by mounting brackets MBa and MBb in such manner as to permit rotatable movement. A control knob CK with a calibration pointer CP is fastened to the control shaft.

The two feedback transformers FTa and FTb are mounted in close and substantially rigid physical relationship with one another and are jointly referred to as ferrite transformer assembly FTA. This assembly, in turn, is mounted in a substantially rigid relationship with mounting brackets MBa and MBb and in such manner as to be in relative close proximity to the poles of the permanent magnet when it is positioned as shown. By way of control knob CK, permanent magnet PM may be rotatably moved in relationship to ferrite transformer assembly FTA, thereby correspondingly to adjust the amount of the magnetic flux from the permanent magnet being intercepted by the ferrite transformer assembly.

FIG. 3 shows the magnetic characteristics of each of the ferrite cores in the ferrite transformer assembly for two different amounts of cross-magnetizing flux provided by the permanent magnet. Curve I shows the magnetic characteristics when no cross-magnetizing flux is present; curve II shows the magnetic characteristics when a fairly strong cross-magnetizing flux is present.

Details of Operation

The operation of the self-oscillating inverter circuit of FIG. 1 is substantially conventional and is explained in detail in conjunction with FIG. 8 of U.S. Pat. No. Re. 31,758 to Nilssen.

The frequency of oscillation of this inverter is determined by the saturation flux density of the ferrite cores in the feedback transformers: the higher this saturation flux density, the lower the frequency of oscillation.

When the magnetic flux from a permanent magnet is made to cross-magnetize the ferrite cores, as illustrated in FIG. 2, the saturation flux density of the ferrite cores diminishes, as indicated in FIG. 3.

The particular position of the permanent magnet in FIG. 2 provides for a maximum degree of cross-magnetization; which implies that, with the magnet in that position, the inverter's oscillation frequency will be at its maximum. By twisting the magnet away from the particular position shown, the degree of cross-magnetization diminishes, and the inverter's oscillation frequency decreases.

By suitably selecting the maximum amount of flux caused to penetrate the ferrite cores—i.e., beyond the level indicated by curve II of FIG. 3—complete removal of positive feedback results, and inverter oscillation ceases. Thus, by suitable design, the frequency control arrangement of FIGS. 1-3 can be arranged such that—in the extreme position, as shown in FIG. 2—inverter oscillation is caused to cease, thereby entirely to remove the high frequency voltage from the inverter's output terminals.

Additional Comments (a) The ability to manually adjust the frequency of a self-oscillation inverter is valuable in a variety of situations. For instance, a voltage of variable frequency may be converted into a current of variable magnitude by way of including an inductor means in the inverter's power output circuit.

(b) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
a source of DC power;
inverter connected in circuit with the source of DC power and operative to oscillate in response to a control input received at a set of inverter control terminals, thereby through inverter oscillation to convert the DC power into an AC output provided at a set of inverter output terminals;
load means connected with the inverter output terminals and operative to utilize a first part of the AC output provided thereat;
positive feedback means: (i) connected in circuit between the inverter output terminals and the inverter control terminals, and (ii) operative by way of saturable inductor means to utilize a second part of the AC output to provide said control input, thereby to cause the inverter to oscillate, the second part being small compared with the first part; the saturable inductor means being: (i) receptive of an adjustable magnetic flux, and (ii) operative in response to the adjustable magnetic flux to correspondingly adjust the frequency of inverter oscillation; and
magnetic flux means adapted to provide adjustable magnetic flux to the saturable inductor means;
whereby the frequency of oscillation can be adjusted by way of subjecting the saturable inductor means to only a relatively small part of the AC output from the inverter means.

2. The arrangement of claim 1 wherein the load means is substantially linear, thereby exhibiting a substantially linear relationship between the magnitude of any voltage provided to it and the magnitude of any current resulting therefrom.

3. An arrangement comprising:
inverter having: (i) DC power input terminals, (ii) control input terminals, and (iii) AC power output terminals; the inverter being operative in response to a control input provided to its control input terminals to oscillate at an inverter frequency, thereby to provide AC power output at the AC power output terminals;
load means connected with the AC power output terminals and operative to absorb a first part of the total AC output power provided thereat; the load means being substantially linear, thereby exhibiting a substantially linear relationship between any voltage provided to it and the current resulting therefrom;
feedback means connected with the AC power output terminals and operative to absorb a second part of the total AC power output provided thereat, the second part being small compared with the first part; the feedback means being: (i) substantially non-linear, thereby exhibiting a substantially non-linear relationship between any voltage provided to it and the current resulting therefrom, (ii) operative to provide the control input to the control input terminals, and (iii) receptive of magnetic flux and operative in response thereto to adjust the inverter frequency; and
permanent magnet means operative to provide an adjustable magnetic flux to the feedback means, thereby to provide for adjustment of the inverter frequency.

4. The arrangement of claim 3 wherein the load means constitutes an entity separate and apart from the feedback means.

5. The arrangement of claim 3 wherein: (i) the DC power input terminals are connected with a DC voltage source having no substantial internal impedance, and (ii) the AC power output terminals constitute an AC voltage source having no substantial internal impedance.

6. An arrangement comprising:
inverter having: (i) DC input terminals connected with a DC voltage source, (ii) control terminals, and (iii) a pair of AC output terminals; the inverter being operative to oscillate in response to a control input provided to its control terminals, thereby to provide an AC output voltage at the AC output terminals;

load means: (i) having a pair of load terminals, (ii) constituting an impedance means of relatively high impedance-magnitude, and (iii) being receptive of load power when provided with at least part of the AC output voltage;

feedback means: (i) having a pair of feedback terminals, (ii) constituting an impedance means of relatively low impedance-magnitude, (iii) being receptive of and responsive to magnetic flux, and (iv) being connected with the control terminals;

connect means operative to connect the load terminals and the feedback terminals in series across the AC output terminals, which results in: (i) a first fraction of the AC output voltage being supplied to the load means, which is thereby being provided with load power, and (ii) a second fraction of the AC output voltage being supplied to the feedback means, which is thereby operative to supply said control input to the control terminals, thereby to cause the inverter to oscillate at a frequency determined at least in part by the amount of magnetic flux being received by the feedback means, the second fraction being small compared with the first fraction; and permanent magnet means operative to provide an adjustable amount of magnetic flux to the feedback means, thereby to provide for adjustment of the frequency at which the inverter oscillates.

7. The arrangement of claim 6 wherein the feedback means comprises saturable inductor means.

8. An arrangement comprising:

a source of DC power;

inverter connected in circuit with the source of DC power and operative to oscillate in response to a control input received at a set of inverter control terminals, thereby through inverter oscillation to convert the DC power an AC output power provided at a set of inverter output terminals, the AC output power constituting substantially all the output power provided by the inverter;

load means connected with the inverter output terminals and operative to utilize a first part of the AC output power;

positive feedback means: (i) connected in circuit between the inverter output terminals and the inverter control terminals, and (ii) operative by way of saturable inductor means to utilize a second part of the AC output power to provide said control input, thereby to cause the inverter to oscillate, the second part being substantially smaller than the first part; the saturable inductor means being: (i) receptive of an adjustable magnetic flux, and (ii) operative in response to the adjustable magnetic flux to correspondingly adjust the frequency of inverter oscillation; and magnetic flux means adapted to provide adjustable magnetic flux to the saturable inductor means;

whereby the frequency of oscillation can be adjusted by way of subjecting the saturable inductor means to only a small part of the AC output power.

9. The arrangement of claim 8 wherein the load means constitutes an element separate and apart from the saturable inductor means.

* * * * *